US010000596B2

(12) United States Patent
Wendland et al.

(10) Patent No.: US 10,000,596 B2
(45) Date of Patent: Jun. 19, 2018

(54) HYDROLYZED DIVINYLBENZENE/MALEIC ANHYDRIDE POLYMERIC MATERIAL (71) Applicant: 3M INNOVATIVE PROPERTIES COMPANY, St. Paul, MN (US)

(72) Inventors: Michael S. Wendland, North St. Paul, MN (US); Michael W. Kobe, Newport, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 173 days.

(21) Appl. No.: 15/101,201

(22) PCT Filed: Dec. 16, 2014

(86) PCT No.: PCT/US2014/070466
§ 371 (c)(1),
(2) Date: Jun. 2, 2016

(87) PCT Pub. No.: WO2015/095110
PCT Pub. Date: Jun. 25, 2015

(65) Prior Publication Data
US 2016/0304645 A1    Oct. 20, 2016

Related U.S. Application Data (60) Provisional application No. 61/918,072, filed on Dec. 19, 2013.

(51) Int. Cl.
*C08F 212/36* (2006.01)
*B01J 39/20* (2006.01)
*C08F 8/12* (2006.01)

(52) U.S. Cl.
CPC ............ *C08F 212/36* (2013.01); *B01J 39/20* (2013.01); *C08F 8/12* (2013.01); *C08F 2800/20* (2013.01); *C08F 2810/50* (2013.01)

(58) Field of Classification Search
CPC .................................................. C08F 212/36
See application file for complete search history.

(56) References Cited

U.S. PATENT DOCUMENTS

| 3,586,646 | A | 6/1971 | Corte |
| 3,799,870 | A | 3/1974 | Heilweil |
| 7,468,414 | B2 | 12/2008 | Nishida |
| 8,859,701 | B2 | 10/2014 | Loick |
| 2005/0131089 | A1 | 6/2005 | Kocon |
| 2005/0256285 | A1 | 11/2005 | Mori |
| 2008/0096987 | A1 | 4/2008 | Podszun |
| 2010/0137535 | A1 | 6/2010 | Kimura |
| 2013/0048853 | A1 | 2/2013 | Nunoshige |
| 2016/0121321 | A1 | 5/2016 | Wendland |

FOREIGN PATENT DOCUMENTS

| CN | 1151334 | 6/1997 |
| CN | 102049242 | 5/2011 |
| GB | 1384516 | 2/1975 |

OTHER PUBLICATIONS

Maciejewska et al (Investigation of the surface area and polarity of porous copolymers of maleic anhydride and divinylbezene, J of Applied polymer Science, vol. 125, 300-307, 2012).*
Dawson, "Chemical Turning of $CO_2$ Sorption in Robust Nanoporous Organic Polymers", Chemical Science, 2011, vol. 2, pp. 1173-1177.
Frank, "Synthesis of Divinylbenzene-Maleic Anhydride Microspheres Using Precipitation Polymerization", Journal of Polymer Science: Part A: Polymer Chemistry, 1998, vol. 36, pp. 2223-2227.
Frank, "Poly(divinylbenzene-alt-maleic anhydride) Microgels: Intermediates to Microspheres and Macrogels in Cross-Linking Copolymerization", Macromolecules, 2002, vol. 35, No. 7, pp. 2728-2735.
Lan, "High Uptakes of Methane in Li-Doped 3D Covalent Organic Frameworks", Langmuir, 2010, vol. 26, No. 1, pp. 220-226.
Li, "Lithium-Doped Conjugated Microporous Polymers for Reversible Hydrogen Storage", Angew. Chem. Int. Ed., 2010, vol. 49, pp. 3330-3333.
Lu, "Sulfonate-Grafted Porous Polymer Networks for Preferential $CO_2$ Adsorption at Low Pressure", Journal of the American Chemical Society, 2011, vol. 133, pp. 18126-18129.
Ogawa, "Preparation of Spherical Polymer Beads of Maleic Anhydride-Styrene-Divinylbenzene and Metal Sorption of Its Derivatives", Journal of Applied Polymer Science, 1984, vol. 29, pp. 2851-2856.
Trivedi, "Preparation and Characterization of Maleic Anhydride Based Resins in Bead and Granular Form", Reactive and Functional Polymers, 1996, vol. 31, pp. 219-224.
Webb, "Surface Area and Pore Structure by Gas Adsorption", Chapter 3 in Analytical Methods in Fine Particle Technology, Micromeritics Instrument Corporation, Norcross, GA, USA, pp. 53-153 (1997).
International Search Report for PCT International Application No. PCT/US2014/070466, dated Mar. 12, 2015, 3 pages.

(Continued)

*Primary Examiner* — Wenwen Cai
(74) *Attorney, Agent, or Firm* — Jean A. Lown (57) ABSTRACT

Hydrolyzed divinylbenzene/maleic anhydride polymeric materials and methods of making these polymeric materials are provided. These polymers have a high BET specific surface area that results from the presence of micropores and/or mesopores. The polymers are useful for the adsorption of low molecular weight (e.g., no greater than 150 gram/mole), basic nitrogen-containing compounds.

13 Claims, 1 Drawing Sheet

(56) References Cited

OTHER PUBLICATIONS

Harada, "Removal of primary and secondary amines by reaction gas chromatography using porous maleic anhydride-divinylbenzene copolymer beads", Bunseki Kagaku, Jul. 10, 1982, vol. 111, pp. 697-701.

* cited by examiner

HYDROLYZED DIVINYLBENZENE/MALEIC ANHYDRIDE POLYMERIC MATERIAL

CROSS REFERENCE TO RELATED APPLICATION

This application is a national stage filing under 35 U.S.C. 371 of PCT/US2014/070466, filed Dec. 16, 2014, which claims the benefit of U.S. Provisional Application No. 61/918072, filed Dec. 19, 2013, the disclosure of which is incorporated by reference in its/their entirety herein.

TECHNICAL FIELD

Hydrolyzed divinylbenzene/maleic anhydride polymeric materials and methods of making the hydrolyzed divinylbenzene/maleic anhydride polymeric materials are described.

BACKGROUND

Polymeric materials prepared from divinylbenzene and maleic anhydride have been known for many years. Since as early as the 1970s, these polymeric materials have been used as ion exchange resins. Many of these polymeric materials are prepared by a process called macroreticulation, which refers to a process of making polymeric beads using suspension polymerization. These processes involve forming droplets of an organic phase suspended in an aqueous phase. The suspended organic phase includes the monomers and an optional porogen. The maleic anhydride content in the final copolymer has been low, however, because this monomer tends to undergo hydrolysis and leave the organic phase. Attempts to reduce the hydrolysis reaction have included replacing the aqueous phase with glycerol or other polar solvents. Macroporous copolymers have been prepared.

SUMMARY

Hydrolyzed divinylbenzene/maleic anhydride polymeric materials and methods of making these polymeric materials are provided. These polymers have a high BET specific surface area that results from the presence of micropores and/or mesopores. The polymers have carboxylic acid groups and are useful for the adsorption of low molecular weight (e.g., no greater than 150 gram/mole), basic nitrogen-containing compounds.

In a first aspect, a hydrolyzed polymeric material is provided that is a reaction product of a) a non-hydrolyzed precursor polymer and b) a hydrolyzing agent. The non-hydrolyzed precursor polymer is a polymerized product of a polymerizable composition that contains i) a monomer mixture and ii) an organic solvent that includes a ketone, an ester, acetonitrile, or a mixture thereof. The monomer mixture includes 1) 8 to 40 weight percent maleic anhydride based on a total weight of monomers in the monomer mixture, 2) 48 to 75 weight percent divinylbenzene based on the total weight of monomers in the monomer mixture, and 3) 0 to 20 weight percent of a styrene-type monomer based on the total weight of monomers in the monomer mixture, wherein the styrene-type monomer is styrene, an alkyl substituted styrene, or a combination thereof. The polymerizable composition is a single phase prior to polymerization. The hydrolyzed polymeric material has a plurality of carboxylic acid groups and a BET specific surface area equal to at least 100 $m^2$/gram.

In a second aspect, a method of making a hydrolyzed polymeric material is provided. The method includes preparing a polymerizable composition, forming a non-hydrolyzed precursor polymer by polymerizing the polymerizable composition, and reacting the non-hydrolyzed precursor polymer with a hydrolyzing agent to form the hydrolyzed polymeric material. The polymerizable composition contains i) a monomer mixture and ii) an organic solvent that includes a ketone, an ester, acetonitrile, or a mixture thereof. The monomer mixture includes 1) 8 to 40 weight percent maleic anhydride based on a total weight of monomers in the monomer mixture, 2) 48 to 75 weight percent divinylbenzene based on the total weight of monomers in the monomer mixture, and 3) 0 to 20 weight percent of a styrene-type monomer based on the total weight of monomers in the monomer mixture, wherein the styrene-type monomer is styrene, an alkyl substituted styrene, or a combination thereof. The polymerizable composition is a single phase prior to polymerization. The hydrolyzed polymeric material has a plurality of carboxylic acid groups and a BET specific surface area equal to at least 100 $m^2$/gram.

DETAILED DESCRIPTION

Non-hydrolyzed divinylbenzene/maleic anhydride precursor polymers are prepared and then treated with a hydrolyzing agent to provide hydrolyzed polymeric materials having a plurality of carboxylic acid groups. The hydrolyzed polymeric materials are porous and have a BET specific surface area equal to at least 100 $m^2$/gram. The hydrolyzed polymeric materials tend to have micropores, mesopores, or a combination thereof that makes them particularly well suited for use as adsorbents for low molecular weight (e.g., no greater than 150 gram/mole), basic nitrogen-containing compounds.

The term "a", "an", and "the" are used interchangeably with "at least one" to mean one or more of the elements being described.

The term "and/or" means either or both. For example "A and/or B" means only A, only B, or both A and B.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "monomer mixture" refers to that portion of a polymerizable composition that includes the monomers. More specifically, the monomer mixture includes at least divinylbenzene and maleic anhydride. The term "polymerizable composition" includes all materials included in the reaction mixture used to form the polymeric material. The polymerizable composition includes, for example, the monomer mixture, the organic solvent, the initiator, and other optional components. Some of the components in the reaction mixture such as the organic solvent may not undergo a chemical reaction but can influence the chemical reaction and the resulting polymeric material.

The term "divinylbenzene/maleic anhydride polymeric material" refers to a polymeric material prepared from divinylbenzene, maleic anhydride, and optionally a styrene-type monomer. Styrene-type monomers are often present as impurities in divinylbenzene.

The term "styrene-type monomer" refers to styrene, an alkyl substituted styrene (e.g., ethyl styrene), or mixtures thereof. These monomers are often present in divinylbenzene as impurities.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (i.e., 77° K) over a range of relative pressures. The term "BET specific surface area" is the surface area per gram of a material that is typically calculated from adsorption isotherm data of the inert gas over a relative pressure range of 0.05 to 0.3 using the BET method (Brunauer-Emmett-Teller method).

The term "room temperature" refers to a temperature in a range of 20° C. to 30° C. or in a range of 20° C. to 25° C.

Porous materials can be characterized based on the size of their pores. The term "micropores" refers to pores having a diameter of less than 2 nanometers. The term "mesopores" refers to pores having a diameter in a range of 2 to 50 nanometers. The term "macropores" refers to pores having a diameter greater than 50 nanometers. The porosity of a material can be characterized from an adsorption isotherm of an inert gas such as nitrogen or argon by the porous material under cryogenic conditions. The adsorption isotherm is typically obtained by measuring adsorption of the inert gas by the porous material at multiple relative pressures in a range of about $10^{-6}$ to about 0.98. The isotherms are then analyzed using various methods such as BET to calculate specific surface areas and such as density functional theory (DFT) to characterize the porosity and the pore size distribution.

A hydrolyzed polymeric material is formed from a non-hydrolyzed precursor polymer prepared from divinylbenzene, maleic anhydride, and an optional styrene-type monomer. The precursor polymeric material is treated with a hydrolyzing agent to prepare the hydrolyzed polymeric material. The conditions used to synthesize the precursor polymeric material are specifically selected to produce hydrolyzed polymeric material that has both high BET specific surface area (e.g., equal to at least 100 m$^2$/gram or equal to at least 150 m$^2$/gram) and a sufficient number of carboxylic acid groups to effectively adsorb low molecular weight (e.g., no greater than 150 gram/mole), basic nitrogen-containing compounds. More specifically, the amount of divinylbenzene crosslinker, the amount of maleic anhydride, the amount of optional styrene-type monomer, and choice of organic solvent used to prepare the non-hydrolyzed precursor polymer are carefully selected and balanced so that the desired combination of properties in the hydrolyzed polymeric material will result.

The non-hydrolyzed precursor polymeric material (i.e., the divinylbenzene/maleic anhydride polymeric material) is synthesized from a monomer mixture of maleic anhydride, divinylbenzene, and an optional styrene-type monomer. More specifically, the monomer mixture includes 1) 8 to 40 weight percent maleic anhydride, 2) 48 to 75 weight percent divinylbenzene, and 3) 0 to 20 weight percent or a styrene-type monomer, wherein the styrene-type monomer is styrene, an alkyl substituted styrene, or a combination thereof. The amounts are based on the total weight of monomers in the monomer mixture.

The amount of maleic anhydride used in the monomer mixture to prepare the precursor polymer determines the number of carboxylic acid functional groups in the hydrolyzed polymeric material. Each maleic anhydride unit included in the non-hydrolyzed precursor polymeric material can result in the formation of two carboxylic acid groups (—COOH groups) in the hydrolyzed polymeric material. If the amount of maleic anhydride is lower than 8 weight percent based on the total weight of monomers in the monomer mixture, the hydrolyzed polymeric material may not have sufficient functional groups (carboxylic acid groups) to adsorb low molecular weight basic molecules. On the other hand, if the amount of maleic anhydride is greater than 40 weight percent based on the total weight of monomers in the monomer mixture, the hydrolyzed polymeric material may not have a sufficiently high BET specific surface area. If the BET specific surface area is too low, the hydrolyzed polymeric material may not have sufficient porosity to make accessible sufficient carboxylic acid groups to adsorb low molecular weight basic molecules.

In some embodiments, the amount of maleic anhydride is at least 8 weight percent, at least 10 weight percent, at least 12 weight percent, at least 15 weight percent, or at least 20 weight percent. The amount of maleic anhydride can be up to 40 weight percent, up to 38 weight percent, up to 35 weight percent, up to 30 weight percent, or up to 25 weight percent. For example, the maleic anhydride may be present in a range of 8 to 40 weight percent, 8 to 38 weight percent, 10 to 40 weight percent, 10 to 35 weight percent, 10 to 30 weight percent, 10 to 25 weight percent, 15 to 40 weight percent, 15 to 35 weight percent, 15 to 30 weight percent, 15 to 25 weight percent, 20 to 40 weight percent, 20 to 35 weight percent, or 20 to 30 weight percent. The amounts are based on the total weight of monomers in the monomer mixture.

The amount of divinylbenzene crosslinker can have a strong influence on the BET specific surface area of both the precursor polymeric material and the hydrolyzed polymeric material. The divinylbenzene contributes to the high cross-link density and to the formation of a rigid polymeric material having micropores and/or mesopores. The BET specific surface area tends to increase with an increase in the amount of divinylbenzene in the monomer mixture. If the amount of divinylbenzene in the monomer mixture is less than 48 weight percent, the hydrolyzed polymeric material may not have a sufficiently high BET specific surface area. On the other hand, if the amount of divinylbenzene is greater than 75 weight percent, the carboxylic acid functionality in the hydrolyzed polymeric material may be undesirably low because there is not sufficient maleic anhydride in the polymerizable composition.

In some embodiments, the amount of divinylbenzene is at least 48 weight percent, at least 50 weight percent, at least 55 weight percent, or at least 60 weight percent. The amount of divinylbenzene can be up to 75 weight percent, up to 70 weight percent, or up to 65 weight percent. For example, the divinylbenzene can be in a range of 48 to 75 weight percent, 50 to 75 weight percent, 50 to 70 weight percent, 50 to 65 weight percent, 55 to 75 weight percent, 55 to 70 weight percent, 55 to 65 weight percent, 60 to 75 weight percent, or 60 to 70 weight percent. The amounts are based on the total weight of monomers in the monomer mixture. In some specific embodiments, the amount of divinylbenzene is in a range of 50 to 65 weight percent based on the total weight of monomers in the monomer mixture.

Divinylbenzene can be difficult to obtain in a pure form. For example, divinylbenzene is often commercially available with purity as low as 55 weight percent. Obtaining divinylbenzene with purity greater than about 80 weight percent can be difficult and/or expensive. The impurities accompanying divinylbenzene are typically styrene-type monomers such as styrene, alkyl substituted styrene (e.g., ethyl styrene), or mixtures thereof. Thus, styrene-type monomers are often present in the monomer mixture along with divinylbenzene and maleic anhydride. The monomer mixture typically contains 0 to 20 weight percent styrene-type monomers based on a total weight of monomers in the monomer mixture. If the content of the styrene-type monomer is greater than 20 weight percent, the crosslink density may be too low and/or the distance between crosslinks may be too large to provide a precursor polymeric material with the desired high BET specific surface area (e.g., at least 300 $m^2$/gram) and/or too low to provide a hydrolyzed polymeric material with the desired high BET specific surface area (e.g., at least 100 $m^2$/gram or at least 150 $m^2$/gram). As the crosslink density decreases, the resulting polymeric material tends to be less rigid and less porous.

Typically, divinylbenzene having a purity of 55 weight percent is not suitable for use in the monomer mixtures because the content of styrene-type monomer impurities is too high. That is, to provide a monomer mixture having a minimum amount of 48 weight percent divinylbenzene, the divinylbenzene often is at least about 80 weight percent pure. Using divinylbenzene having a lower purity than about 80 weight percent can result in the formation of a precursor polymeric material and/or a hydrolyzed polymeric material with an undesirably low BET specific surface area.

In some embodiments, the amount of styrene-type monomers is at least 1 weight percent, at least 2 weight percent, or at least 5 weight percent. The amount of styrene-type monomer can be up to 20 weight percent, up to 15 weight percent, up to 12 weight percent, or up to 10 weight percent. For example, the amount of styrene-type monomer in the monomer mixture can be in a range of 0 to 20 weight percent, 1 to 20 weight percent, 2 to 20 weight percent, 5 to 20 weight percent, 5 to 15 weight percent, or 10 to 15 weight percent. The amounts are based on the total weight of monomers in the monomer mixture.

Overall, the monomer mixture includes 1) 8 to 40 weight percent maleic anhydride based on a total weight of monomers in the monomer mixture, 2) 48 to 75 weight percent divinylbenzene based on the total weight of monomers in the monomer mixture, and 3) 0 to 20 weight percent styrene-type monomer based on the total weight of monomers in the monomer mixture. In other embodiments, the monomer mixture contains 10 to 40 weight percent maleic anhydride, 50 to 75 weight percent divinylbenzene, and 1 to 20 weight percent styrene-type monomer. In other embodiments, the monomer mixture contains 15 to 35 weight percent maleic anhydride, 55 to 75 weight percent divinylbenzene, and 1 to 20 weight percent styrene-type monomer. In still other embodiments, the monomer mixture contains 20 to 30 weight percent maleic anhydride, 55 to 75 weight percent divinylbenzene, and 1 to 20 weight percent styrene-type monomer. In further embodiments, the monomer mixture contains 20 to 35 weight percent maleic anhydride, 55 to 70 weight percent divinylbenzene, and 1 to 20 weight percent styrene-type monomers.

The monomer mixture typically contains at least 95 weight percent monomers selected from maleic anhydride, divinylbenzene, and styrene-type monomer. For example, at least 97 weight percent, at least 98 weight percent, at least 99 weight percent, at least 99.5 weight percent, or at least 99.9 weight percent of the monomers in the monomer mixture are selected from maleic anhydride, divinylbenzene, and styrene-type monomer. In many embodiments, the only monomers purposefully added to the monomer mixture are maleic anhydride and divinylbenzene with any other monomers being present (including the styrene-type monomers) as impurities in the maleic anhydride and the divinylbenzene.

In addition to the monomer mixture, the polymerizable composition used to form the non-hydrolyzed precursor polymeric material includes an organic solvent. The polymerizable composition is a single phase prior to polymerization. Stated differently, prior to polymerization, the polymerizable composition is not a suspension. The organic solvent is selected to dissolve the monomers included in the monomer mixture and to solubilize the precursor polymeric material as it begins to form. The organic solvent includes a ketone, ester, acetonitrile, or mixture thereof.

The organic solvent can function as a porogen as the precursor polymeric material is formed. The organic solvent choice can strongly influence the BET specific surface area and the size of the pores formed in the non-hydrolyzed precursor polymeric material. The BET specific surface area and the fraction of the BET specific surface area attributable to micropores and/or mesopores tend to correlate with the percent conversion prior to formation of a second phase in the polymerizable composition. A delayed formation of the second phase tends to favor the preparation of precursor polymeric material with high BET specific surface area. The timing of the formation of the second phase is highly dependent on the organic solvent choice. The second phase includes the growing non-hydrolyzed precursor material (the second phase forms when the molecular weight of the growing non-hydrolyzed precursor increases to the point that it is no longer soluble in the first phase).

Organic solvents that are particularly suitable include ketones, esters, acetonitrile, and mixtures thereof. Other organic solvents can be added along with one or more of these organic solvents provided that the resulting precursor polymeric material has a BET specific surface area equal to at least 300 $m^2$/gram. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tent-butyl acetate.

The organic solvent can be used in any desired amount. The polymerizable compositions often have percent solids in a range of 1 to 75 weight percent. If the percent solids are too low, the polymerization time may become undesirably long. The percent solids are often at least 1 weight percent, at least 2 weight percent, at least 5 weight percent, at least 10 weight percent, or at least 15 weight percent. If the percent solids are too great, however, the viscosity may be too high for effective mixing. Further, increasing the percent solids tends to result in the formation of polymeric material with a lower BET specific surface area. The percent solids can be up to 75 weight percent, up to 70 weight percent, up to 60 weight percent, up to 50 weight percent, up to 40 weight percent, up to 30 weight percent, or up to 25 weight percent. For example, the percent solids can be in a range of 5 to 75 weight percent, 5 to 50 weight percent, 5 to 40 weight percent, 5 to 30 weight percent, or 5 to 25 weight percent.

In addition to the monomer mixture and organic solvent, the polymerizable compositions typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature. In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 weight percent, 0.05 to 8 weight percent, 0.05 to 5 weight percent, 0.1 to 10 weight percent, 0.1 to 8 weight percent, 0.1 to 5 weight percent, 0.5 to 10 weight percent, 0.5 to 8 weight percent, 0.5 to 5 weight percent, 1 to 10 weight percent, 1 to 8 weight percent, or 1 to 5 weight percent. The weight percent is based on a total weight of monomers in the polymerizable composition.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile), which is often referred to as AIBN, and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tent-butyl peroxide and mixtures thereof. The temperature needed to activate the thermal initiator is often in a range of 25° C. to 160° C., in a range of 30° C. to 150° C., in a range of 40° C. to 150° C., in a range of 50° C. to 150° C., in a range of 50° C. to 120° C., or in a range of 50° C. to 110° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al(III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 weight percent, less than 0.3 weight percent, less than 0.2 weight percent, less than 0.1 weight percent, less than 0.05 weight percent, or less than 0.01 weight percent surfactant based on the total weight of the polymerizable composition. The absence of a surfactant is advantageous because these materials tend to restrict access to and, in some cases, fill micropores and mesopores in a porous material. The presence of a surfactant could reduce the capacity of the hydrolyzed polymeric material to adsorb low molecular weight basic molecules.

When the polymerizable composition is heated in the presence of a free radical initiator, polymerization of the monomers in the monomer mixture occurs. By balancing the amounts of each monomer in the monomer mixture and by selection of an organic solvent that can solubilize all of the monomers and the growing polymeric material during its early formation stage, a non-hydrolyzed precursor polymer can be prepared that has a BET specific surface area equal to at least 300 $m^2$/gram. The BET specific surface area of the non-hydrolyzed precursor polymer can be at least 350 $m^2$/gram, at least 400 $m^2$/gram, at least 450 $m^2$/gram, or at least 500 $m^2$/gram. The BET specific surface area can be, for example, up to 1000 $m^2$/gram or higher, up to 900 $m^2$/gram, up to 800 $m^2$/gram, up to 750 $m^2$/gram, or up to 700 $m^2$/gram.

The high BET specific surface area is at least partially attributable to the presence of micropores and/or mesopores in the non-hydrolyzed precursor polymeric material. The argon adsorption isotherms of the precursor polymeric materials indicate that there is considerable adsorption at relative pressures below 0.1, which suggests that micropores are present. There is a modest increase in adsorption at higher relative pressures up to about 0.95. This increase is indicative of a wide distribution of mesopores. In some embodiment, at least 20 percent of the BET specific surface area is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent or higher, or up to 75 percent or higher.

The non-hydrolyzed precursor polymer is a granular material that can be treated with a hydrolyzing agent to provide a hydrolyzed polymeric material. The hydrolyzing agent reacts with the maleic anhydride units resulting in the formation of two carboxylic acid groups (—COOH groups). Any suitable hydrolyzing agent that can react with the anhydride group (—(CO)—O—(CO)—) of the maleic anhydride units can be used. In many embodiments, the hydrolyzing agent is a base such as a basic material dissolved in water. One example basic material is an alkali metal hydroxide such as sodium hydroxide (e.g., an aqueous solution of sodium hydroxide). Alternatively, the hydrolyzing agent could be water alone at elevated temperatures (e.g., above room temperature to boiling) or a dilute acid at slightly elevated temperatures (e.g., above room temperature to about 80° C.). In many embodiments, the preferred hydrolyzing agent is a base such as an alkali metal hydroxide. The non-hydrolyzed precursor polymeric material is mixed with a solution of alkali metal hydroxide dissolved in an alcohol such as methanol. The mixture is heated at a temperature near 80° C. for several hours (e.g., 4 to 12 hours). The hydrolyzed polymeric material can then be treated with hydrochloric acid to convert any carboxylate salts to carboxylic acid groups.

The hydrolyzed polymeric material has a BET specific surface area less than that of the non-hydrolyzed precursor polymeric material. The opening of the anhydride group may sufficiently increase the conformational freedom in the backbone resulting in decreased porosity. In addition, hydrogen bonding between carboxylic acids in the hydrolyzed material could possibly restrict or block access to pores. The BET specific surface area of the hydrolyzed polymeric material is often about 30 to 80 percent, 30 to 60 percent, 40 to 80 percent, or 40 to 60 percent of the BET specific surface area of the non-hydrolyzed precursor polymeric material. Because of this decrease, it is often desirable to prepare a precursor polymeric material having the highest possible BET specific surface area yet having sufficient maleic anhydride units to provide sufficient carboxylic acid groups upon hydrolysis.

The hydrolyzed polymeric material typically has a BET specific surface area equal to at least 100 $m^2$/gram. In some embodiments, the BET specific surface area is at least at least 150 $m^2$/gram, at least 175 $m^2$/gram, at least 200 $m^2$/gram, at least 225 $m^2$/gram, at least 250 $m^2$/gram, or at least 300 $m^2$/gram. The BET specific surface area can be up to 600 $m^2$/gram or higher, up to 500 $m^2$/gram, or up to 400 $m^2$/gram. In some embodiments, the BET specific surface area is in a range of 100 to 600 $m^2$/gram, in a range of 150 to 600 $m^2$/gram, or in a range of 200 to 500 $m^2$/gram.

The argon adsorption isotherms of the hydrolyzed polymeric materials indicate that there is considerable adsorption at relative pressures below 0.1, which suggests that micropores are present.

There is a modest increase in adsorption at higher relative pressures up to about 0.95. This increase is indicative of a wide distribution of mesopores. In some embodiment, at least 20 percent of the BET specific surface area is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent, or higher, or up to 75 percent or higher.

The hydrolyzed polymeric material has carboxylic acid groups. In some embodiments, the hydrolyzed polymeric material contains at least 2 millimoles of carboxylic acid groups per gram of polymer. For example, the number of carboxylic acid groups in the hydrolyzed polymeric material is at least 3 millimoles/gram, or at least 5 millimoles/gram. The number of carboxylic acid groups can be up to 10 millimoles/gram or higher, up to 8 millimoles/gram, or up to 6 millimoles/gram.

These carboxylic acid groups can be used to adsorb low molecular weight (e.g., no greater than 150 gram/mole), basic nitrogen-containing compounds on the hydrolyzed polymeric material. For example, the hydrolyzed polymeric material, which is a granular material, can be placed within a column and a sample containing a basic nitrogen-containing compound can be introduced into the column and adsorbed by the hydrolyzed polymeric material. The term "adsorb" or "adsorption" can refer to chemical adsorption, physical adsorption, or both. The hydrolyzed polymeric material can adsorb, for example, at least 0.25 millimoles of the basic nitrogen-containing compound per gram. For example, the amount adsorbed can be at least 0.30 millimoles/gram, at least 0.35 millimoles/gram, at least 0.40 millimoles/gram, at least 0.45 millimoles/gram, or at least 0.50 millimoles/gram.

The basic nitrogen-containing compounds can be classified as Lewis bases, Bronsted-Lowry bases, or both. Suitable basic nitrogen-containing compounds include, but are not limited to, ammonia, hydrazine compounds, amine compounds (e.g., alkyl amines, dialkylamines, triaalkylamines), alkanolamines, alkylene diamines, arylamines), and nitrogen-containing heterocyclic (saturated and unsaturated) compounds. Specific basic nitrogen-containing compounds include, for example, ammonia, hydrazine, methylhydrazine, methylamine, dimethylamine, trimethylamine, ethylamine, diethylamine, triethylamine, propylamine, dipropylamine, tripropylamine, isopropylamine, diisopropylamine, triisopropylamine, ethanolamine, cyclohexylamine, morpholine, pyridine, benzylamine, phenylhydrazine, ethylene diamine, and 1,3-propane diamine.

Various polymeric materials and methods of making the polymeric material are provided.

Embodiment 1 is a hydrolyzed polymeric material that is a reaction product of a) a non-hydrolyzed precursor polymer and b) a hydrolyzing agent. The non-hydrolyzed precursor polymer is a polymerized product of a polymerizable composition that contains i) a monomer mixture and ii) an organic solvent that includes a ketone, an ester, acetonitrile, or a mixture thereof. The monomer mixture includes 1) 8 to 40 weight percent maleic anhydride based on a total weight of monomers in the monomer mixture, 2) 48 to 75 weight percent divinylbenzene based on the total weight of monomers in the monomer mixture, and 3) 0 to 20 weight percent of a styrene-type monomer based on the total weight of monomers in the monomer mixture, wherein the styrene-type monomer is styrene, an alkyl substituted styrene, or a combination thereof. The polymerizable composition is a single phase prior to polymerization. The hydrolyzed polymeric material has a plurality of carboxylic acid groups and a BET specific surface area equal to at least 100 $m^2$/gram.

Embodiment 2 is the hydrolyzed polymeric material of embodiment 1, wherein the BET specific surface area is equal to at least 150 $m^2$/gram or at least 200 $m^2$/gram.

Embodiment 3 is the hydrolyzed polymeric material of embodiment 1 or 2, wherein the monomer mixture comprises 10 to 40 weight percent maleic anhydride, 50 to 75 weight percent divinylbenzene, and 1 to 20 weight percent styrene-type monomer.

Embodiment 4 is the hydrolyzed polymeric material of embodiment 1 or 2, wherein, the monomer mixture comprises 15 to 35 weight percent maleic anhydride, 55 to 75 weight percent, and 1 to 20 weight percent styrene-type monomer.

Embodiment 5 is the hydrolyzed polymeric material of embodiment 1 or 2, wherein the monomer mixture comprises 20 to 30 weight percent maleic anhydride, 55 to 75 weight percent divinylbenzene, and 1 to 20 weight percent styrene-type monomer.

Embodiment 6 is the hydrolyzed polymeric material of any one of embodiments 1 to 5, wherein at least 25 percent, at least 50 percent, or at least 75 percent of the BET specific surface area is attributable to micropores, mesopores, or a combination thereof.

Embodiment 7 is the hydrolyzed polymeric material of any one of embodiments 1 to 6, wherein the organic solvent comprises a ketone comprising methyl ethyl ketone, methyl isobutyl ketone, or a mixture thereof.

Embodiment 8 is the hydrolyzed polymeric material of any one of embodiments 1 to 6, wherein the organic solvent comprises an ester comprising an acetate ester comprising ethyl acetate, amyl acetate, tent-butyl acetate, or a combination thereof.

Embodiment 9 is the hydrolyzed polymeric material of any one of embodiments 1 to 6, wherein the organic solvent comprises acetonitrile.

Embodiment 10 is the hydrolyzed polymeric material of any one of embodiments 1 to 9, wherein the polymerizable composition has percent solids equal to at least 5 weight percent.

Embodiment 11 is the hydrolyzed polymeric material of any one of embodiments 1 to 10, wherein the BET specific surface area is in a range of 150 to 600 m$^2$/gram and the concentration of carboxylic acid groups is in a range of 2 to 10 mmoles/gram.

Embodiment 12 is the hydrolyzed polymeric material of any one of embodiments 1 to 11, wherein at least 99 weight percent of the monomers in the monomer mixture are divinylbenzene, maleic anhydride, or the styrene-type monomer.

Embodiment 13 is the hydrolyzed polymeric material of any one of embodiments 1 to 12, wherein the hydrolyzed polymeric material adsorbs at least 0.25 mmoles per gram of a basic nitrogen-containing compound having a molecular weight no greater than 150 grams per mole.

Embodiment 14 is a method of making a hydrolyzed polymeric material. The method includes preparing a polymerizable composition, forming a non-hydrolyzed precursor polymer by polymerizing the polymerizable composition, and reacting the non-hydrolyzed precursor polymer with a hydrolyzing agent to form the hydrolyzed polymeric material. The polymerizable composition contains i) a monomer mixture and ii) an organic solvent that includes a ketone, an ester, acetonitrile, or a mixture thereof. The monomer mixture includes 1) 8 to 40 weight percent maleic anhydride based on a total weight of monomers in the monomer mixture, 2) 48 to 75 weight percent divinylbenzene based on the total weight of monomers in the monomer mixture, and 3) 0 to 20 weight percent of a styrene-type monomer based on the total weight of monomers in the monomer mixture, wherein the styrene-type monomer is styrene, an alkyl substituted styrene, or a combination thereof. The polymerizable composition is a single phase prior to polymerization. The hydrolyzed polymeric material has a plurality of carboxylic acid groups and a BET specific surface area equal to at least 100 m$^2$/gram.

Embodiment 15 is the method of embodiment 14, wherein the BET specific surface area is equal to at least at least 150 m$^2$/gram or at least 200 m$^2$/gram.

Embodiment 16 is the method of embodiment 14 or 15, wherein the monomer mixture comprises 10 to 40 weight percent maleic anhydride, 50 to 75 weight percent divinylbenzene, and 1 to 20 weight percent styrene-type monomer.

Embodiment 17 is the method of embodiment 14 or 15, wherein, the monomer mixture comprises 15 to 35 weight percent maleic anhydride, 55 to 75 weight percent, and 1 to 20 weight percent styrene-type monomer.

Embodiment 18 is the method of embodiment 14 or 15, wherein the monomer mixture comprises 20 to 30 weight percent maleic anhydride, 55 to 75 weight percent divinylbenzene, and 1 to 20 weight percent styrene-type monomer.

Embodiment 19 is the method of any one of embodiments 14 to 18, wherein at least 25 percent, at least 50 percent, or at least 75 percent of the BET specific surface area is attributable to micropores, mesopores, or a combination thereof.

Embodiment 20 is the method of any one of embodiments 14 to 19, wherein the organic solvent comprises a ketone comprising methyl ethyl ketone, methyl isobutyl ketone, or a mixture thereof.

Embodiment 21 is the method of any one of embodiments 14 to 19, wherein the organic solvent comprises an ester comprising an acetate ester comprising ethyl acetate, amyl acetate, tent-butyl acetate, or a combination thereof.

Embodiment 22 is the method of any one of embodiments 14 to 19, wherein the organic solvent comprises acetonitrile.

Embodiment 23 is the method of any one of embodiments 14 to 22, wherein the polymerizable composition has percent solids equal to at least 5 weight percent.

Embodiment 24 is the method of any one of embodiments 14 to 23, wherein the BET specific surface area is in a range of 150 to 600 m$^2$/gram and the concentration of carboxylic acid groups is in a range of 2 to 10 mmoles/gram.

Embodiment 25 is the method of any one of embodiments 14 to 24, wherein at least 99 weight percent of the monomers in the monomer mixture are divinylbenzene, maleic anhydride, or the styrene-type monomer.

Embodiment 26 is the method of any one of embodiments 14 to 25, wherein the hydrolyzed polymeric material adsorbs at least 0.25 mmoles per gram of a basic nitrogen-containing compound having a molecular weight no greater than 150 grams per mole.

EXAMPLES

TABLE 1

| List of materials | |
|---|---|
| Chemical Name | Chemical Supplier |
| Methanol | BDH Merck Ltd., Poole Dorset, UK |
| Concentrated hydrogen chloride (HCl) | EMD Millipore Chemicals, Billerica, MA |
| Ethyl acetate (EtOAc) | EMD Millipore Chemicals, Billerica, MA |
| Benzoyl peroxide (BPO) | Sigma-Aldrich, Milwaukee, WI |
| Methyl ethyl ketone (MEK) | J. T. Baker, Phillipsburg, NJ |
| Divinylbenzene (DVB) (80% tech grade), which contained 80 weight percent DVB and 20 weight percent styrene-type monomers. The calculation of moles of DVB used to prepare the polymeric material does take into account the purity. | Sigma-Aldrich, Milwaukee, WI |
| Sodium hydroxide (NaOH) | EMD Millipore Chemicals, Billerica, MA |
| Maleic anhydride (MA) | Alfa Aesar, Ward Hill, MA |
| Acetonitrile (ACN) | EMD Millipore Chemicals, Billerica, MA |

Gas Sorption Analysis:

Porosity and gas sorption experiments were performed using a Micromeritics Instrument Corporation (Norcross, Ga.) accelerated surface area and porosimetry system (ASAP 2020) using adsorbates of ultra-high purity. The following is a typical method used for the characterization of the porosity within the exemplified materials. In a Micromeritics half inch diameter sample tube, 50 to 300 milligrams of material were usually heated at 150° C. under ultra-high vacuum (3 to 7 micrometers Hg) for 2 hours on the analysis port of the ASAP 2020 to remove residual solvent and other adsorbates. The hydrolyzed materials Examples 1-5 and Comparative Example 2 were heated at 80° C. for 2 hours under ultra-high vacuum (3-7 micrometers Hg) on the analysis port of the ASAP 2020 to remove residual solvent and other adsorbates. Argon adsorption isotherms at 77° K were obtained using low pressure dosing (5 cm$^3$/g) at a relative pressures (p/p°) less than 0.1 and a pressure table of linearly spaced pressure points from a relative pressures (p/p°) in a range from 0.1 to 0.98. The method made use of the following equilibrium intervals: 90 seconds at relative pressures (p/p°) less than $10^{-5}$, 40 seconds at relative pressure (p/p°) in a range of $10^{-5}$ to 0.1, and 20 seconds at relative pressure (p/p°) greater than 0.1. Helium was used for the free space determination, after argon adsorption analysis, both at ambient temperature (e.g., room temperature) and at 77° K. BET specific surface areas ($SA_{BET}$) were calculated from argon adsorption data by multipoint Brunauer-Emmett-Teller (BET) analysis. Apparent micropore distributions were calculated from argon adsorption data by density functional theory (DFT) analysis using the argon at 77° K on carbon slit pores by non-linear density functional theory (NLDFT) model. The total pore volume was calculated from the total amount of argon adsorbed at a relative pressure (p/p°) equal to approximately 0.98. BET, DFT and total pore volume analyses were performed using Micromeritics MicroActive Version 1.01 software.

Preparatory Example 1

In a 40 mL vial, 0.8523 grams (5.24 mmoles) divinylbenzene (DVB) (80 weight percent (wt. %) purity, tech grade), 94.6 milligrams (965 micromoles) of maleic anhydride (MA), and 47.8 milligrams (197 micromoles) of benzoyl peroxide (BPO) were dissolved in 20.0 mL of ethyl acetate (EtOAc). The polymerizable composition had 5.0 wt. % solids in EtOAc and contained a monomer mixture (72.0 wt. % DVB, 10.0 wt. % MA, and 18.0 wt. % styrene-type monomers) and 5 wt. % BPO (based on total weight of monomers). The polymerizable composition was bubbled with nitrogen for 10 minutes. The vial was then capped and placed in a sand bath at 95° C. The polymerizable composition was heated at this elevated temperature for 17 hours. A white precipitate that had formed was isolated by vacuum filtration and then washed with EtOAc. The solid was placed in a 40 mL vial and 30 mL of EtOAc was added to the vial. The vial was shaken on a wrist shaker for two hours at room temperature. The solid was again isolated by vacuum filtration and washed with EtOAc. The solid was placed in a 40 mL vial and 30 mL of EtOAc was added to the vial. The solid was allowed to stand in EtOAc overnight. The solid was again isolated by vacuum filtration and washed with EtOAc. The solid was then dried under high vacuum at 110° C. overnight. This material had a BET specific surface area ($SA_{BET}$) of 782.9 m$^2$/gram and a total pore volume of 0.711 cm$^3$/gram (p/p° equal to 0.976) as determined by argon adsorption.

Preparatory Example 2

In a 40 mL vial, 0.7567 grams (4.65 mmoles) DVB (80 wt. % purity, tech grade), 0.1895 grams (1.93 mmoles) of MA, and 47.3 milligrams (195 micromoles) of BPO were dissolved in 20.0 mL of EtOAc. The polymerizable composition had 5.0 wt. % solids in EtOAc and contained a monomer mixture (64.0 wt. % DVB, 20.0 wt. % MA, and 16.0 wt. % styrene-type monomers) and 5 wt. % BPO (based on total weight of monomers). The polymerizable composition was bubbled with nitrogen for 10 minutes. The vial was then capped and placed in a sand bath at 95° C. The polymerizable composition was heated at this elevated temperature for 17 hours. A white precipitate that had formed was isolated by vacuum filtration and washed with EtOAc. The solid was placed in a 40 mL vial and 30 mL of EtOAc was added to the vial. The vial was shaken on a wrist shaker for two hours at room temperature. The solid was again isolated by vacuum filtration and washed with EtOAc. The solid was placed in a 40 mL vial and 30 mL of EtOAc was added to the vial. The solid was allowed to stand in EtOAc overnight. The solid was again isolated by vacuum filtration and washed with EtOAc. The solid was then dried under high vacuum at 110° C. overnight. This material had a $SA_{BET}$ of 695.4 m$^2$/gram and a total pore volume of 0.629 cm$^3$/gram (p/p° equal to 0.978) as determined by argon adsorption.

Preparatory Example 3

In a 4 ounce jar, 2.68 grams (16.5 mmoles) DVB (80 wt. % purity, tech grade), 1.01 grams (10.3 mmoles) of MA, and 75.1 milligrams (310 micromoles) of BPO were dissolved in 71.25 grams of EtOAc. The polymerizable composition had 4.9 wt. % solids in EtOAc and contained a monomer mixture (58.1 wt. % DVB, 27.4 wt. % MA, and 14.5 wt. % styrene-type monomers) and 2 wt. % BPO (based on total weight of monomers). The polymerizable composition was bubbled with nitrogen for 10 minutes. The jar was then capped and placed in a sand bath at 95° C. The polymerizable composition was heated at this elevated temperature for 17 hours. A white precipitate that had formed was isolated by vacuum filtration and washed with EtOAc. The solid was placed in a 4 ounce jar and 100 mL of EtOAc was added to the jar. The solid was allowed to stand in EtOAc for one hour at room temperature. The solid was again isolated by vacuum filtration and washed with EtOAc. The solid was placed in a 4 ounce jar and 100 mL of EtOAc was added. The solid was allowed to stand in EtOAc overnight. The solid was again isolated by vacuum filtration and washed with EtOAc. The solid was then dried under high vacuum at 110° C. overnight. This material had a $SA_{BET}$ of 696.6 m$^2$/gram and a total pore volume of 0.649 cm$^3$/gram (p/p° equal to 0.975) as determined by argon adsorption.

Preparatory Example 4

In a 4 ounce jar, 2.40 grams (14.7 mmoles) DVB (80 wt. % purity, tech grade), 1.36 grams (13.9 mmoles) of MA, and 75.3 milligrams (311 micromoles) of BPO were dissolved in 71.26 grams of EtOAc. The polymerizable composition had 5.0 wt. % solids in EtOAc and contained a monomer mixture (51.0 wt. % DVB, 36.2 wt. % MA, and 12.8 wt. % styrene-type monomers) and 2 wt. % BPO (based on total weight of monomers). The polymerizable composition was bubbled with nitrogen for 10 minutes. The jar was then capped and placed in a sand bath at 95° C. The polymerizable composition was heated at this elevated temperature for 17 hours. A white precipitate that had formed was isolated by vacuum filtration and washed with EtOAc. The solid was placed in a 4 ounce jar and 100 mL of EtOAc was added to the jar. The solid was allowed to stand in EtOAc for one hour at room temperature. The solid was again isolated by vacuum filtration and washed with EtOAc. The solid was placed in a 4 ounce jar and 100 mL of EtOAc was added to the vial. The solid was allowed to stand in EtOAc overnight.

The solid was again isolated by vacuum filtration and washed with EtOAc. The solid was then dried under high vacuum at 110° C. overnight. This material had a $SA_{BET}$ of 612.9 m²/gram and a total pore volume of 0.581 cm³/gram (p/p° equal to 0.973) as determined by argon adsorption.

Preparatory Example 5

In a 4 ounce jar, 2.68 grams (16.5 mmoles) DVB (80 wt. %, tech grade), 1.01 grams (10.3 mmoles) of MA, and 74.8 milligrams (309 micromoles) of BPO were dissolved in 71.3 grams of methyl ethyl ketone (MEK). The polymerizable composition had 4.9 wt. % solids in MEK and contained a monomer mixture (58.1 wt. % DVB, 27.4 wt. % MA, and 14.5 wt. % styrene-type monomers) and 2 wt. % BPO (based on total weight of monomers). The polymerizable composition was bubbled with nitrogen for 10 minutes. The jar was then capped and placed in a sand bath at 95° C. The polymerizable composition was heated at this elevated temperature for 17 hours. A white precipitate that had formed was isolated by vacuum filtration and washed with MEK. The solid was placed in a 4 ounce jar and 100 mL of MEK was added to the jar. The solid was allowed to stand in MEK for one hour at room temperature. The solid was again isolated by vacuum filtration and washed with MEK. The solid was placed in a 4 ounce jar and 100 mL of MEK was added to the jar. The solid was allowed to stand in MEK overnight. The solid was again isolated by vacuum filtration and washed with MEK. The solid was then dried under high vacuum at 95° C. for eight hours. This material had a $SA_{BET}$ of 632.5 m²/gram and a total pore volume of 0.576 cm³/gram (p/p° equal to 0.977) as determined by argon adsorption.

Preparatory Example 6

In a 20 mL vial, 0.64 grams (3.9 mmoles) DVB (80 wt. %, tech grade), 0.36 grams (3.7 mmoles) of MA, and 20.8 milligrams (85.9 micromoles) of BPO were dissolved in 9.00 grams of acetonitrile (ACN). The polymerizable composition had 10.0 wt. % solids in ACN and contained a monomer mixture (51.2 wt. % DVB, 36.0 wt. % MA, and 12.8 wt. % styrene-type monomers) and 2 wt. % BPO (based on total weight of monomers). The polymerizable composition was bubbled with nitrogen for 10 minutes. The jar was then capped and placed in a sand bath at 95° C. The polymerizable composition was heated at this elevated temperature for 17 hours. A white precipitate that had formed was isolated by vacuum filtration and washed with ACN. The solid was placed in a 20 mL vial and 15 mL of ACN was added to the vial. The solid was allowed to stand in ACN for one hour at room temperature. The solid was again isolated by vacuum filtration and washed with ACN. The solid was placed in a 20 mL vial and 15 mL of ACN was added to the vial. The solid was allowed to stand in ACN overnight. The solid was again isolated by vacuum filtration and washed with ACN. The solid was then dried under high vacuum at 95° C. for eight hours. This material had a $SA_{BET}$ of 397.5 m²/gram and a total pore volume of 0.232 cm³/gram (p/p° equal to 0.980) as determined by argon adsorption.

Preparatory Example 7

In a 4 ounce jar, 4.39 grams (27.0 mmoles) divinylbenzene (DVB) (80 wt. %, tech grade), 1.65 grams (16.8 mmoles) of maleic anhydride (MA) and 121.4 milligrams (501 micromoles) of benzoyl peroxide (BPO) was dissolved in 8.1 grams of MEK. The polymerizable composition had 75.0 wt. % solids in MEK and contained a monomer mixture (58.1 wt. % DVB, 27.4 wt. % MA, and 14.5 wt. % styrene-type monomers) and 2 wt. % BPO (based on total weight of monomers). The polymerization mixture was bubbled with nitrogen for 10 minutes. The jar was then capped and placed in a sand bath at 95° C. The polymerization was heated at this elevated temperature for 17 hours. A white precipitate formed and was isolated by vacuum filtration and then washed with MEK. The solid was placed in a 4 ounce jar and 100 mL of MEK was added to the jar. The solid was allowed to stand in MEK for one hour at room temperature. The solid was again isolated by vacuum filtration and washed with MEK. The solid was placed in a 4 ounce jar and 100 mL of MEK was added to the jar. The solid was allowed to stand in MEK overnight. The solid was again isolated by vacuum filtration and washed with MEK. The solid was then dried under high vacuum at 95° C. for eight hours. This material had a $SA_{BET}$ of 475.3 m²/gram and a total pore volume of 0.413 cm³/gram (p/p° equal to 0.976) as determined by argon adsorption.

Example 1

The polymeric material of Preparatory Example 3 was treated with a hydrolyzing agent (NaOH). More specifically, 3.5 grams (87.5 mmoles) of sodium hydroxide (NaOH) was dissolved in 60 mL of methanol (MeOH) within a 4 ounce jar. To this solution was added 0.50 grams of the precursor polymeric material of Preparatory Example 3, which was prepared from a monomer mixture containing 58.1 wt. % DVB, 27.4 wt. % MA, and 14.5 wt. % styrene-type monomers. The jar was then capped and placed in a sand bath at 80° C. This suspension was heated at this elevated temperature for 18 hours. The solid was isolated by vacuum filtration and washed with deionized water. The solid was placed in a 20 mL vial, and the vial was half filled with 0.1 M aqueous hydrogen chloride (HCl). The solid was allowed to stand in the aqueous HCl for 30 minutes. The solid was again isolated by vacuum filtration and washed with deionized water. The solid was then dried under high vacuum at 80° C. overnight. This material had a $SA_{BET}$ of 359.6 m²/gram and a total pore volume of 0.359 cm³/gram (p/p° equal to 0.978) as determined by argon adsorption.

Figure 1:
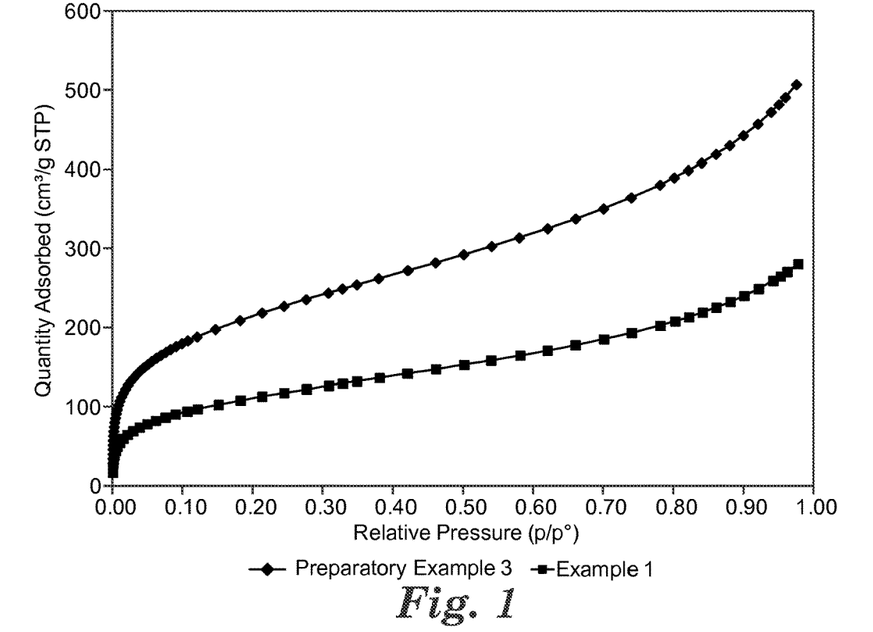
FIG. 1 is a plot of the argon adsorption isotherm at 77° K for the porous precursor polymer of Preparatory Example 3 and the corresponding hydrolyzed polymeric material of Example 1.

FIG. 1 shows the argon adsorption isotherms for Preparatory Example 3 and Example 1. The shapes of both isotherms are similar with both showing significant adsorption at relative pressures less than 0.1. This behavior is indicative of a material with a significant population of micropores. The continued gradual increase in the quantity of gas adsorbed with both materials in the relative pressure range from about 0.2 to about 0.8 is indicative of a population of mesopores.

Figure 2:
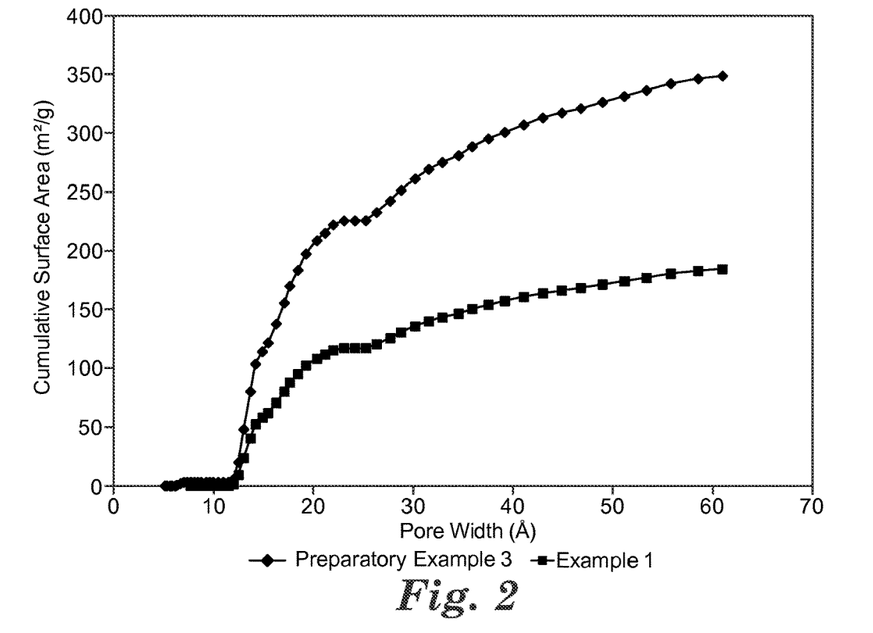
FIG. 2 is a plot of cumulative surface area versus pore width for the porous precursor polymer of Preparatory Example 3 and the corresponding hydrolyzed polymeric material of Example 1.

FIG. 2 further supports this interpretation of the pore size distribution. This figure is a plot of pore width (Angstroms) versus cumulative surface area for Preparatory Example 3 and Example 1. The data is based on analysis of the adsorption isotherms by density functional theory (DFT) analysis using the argon at 77° K on carbon slit pores by non-linear density functional theory (NLDFT) model which tends to be most reliable for pores with diameters up to 6 nm (nanometers). The DFT model is described in the following book: P. A. Webb and C. Orr, *Surface Area and Pore Structure by Gas Adsorption: Analytical Methods in Fine Particle Technology*, Micromeritics Instrument Corporation, Norcross, Ga., pages 53-153 (1997). From this analysis, a significant amount of the BET specific surface area arises from micropores. Further, nearly 50 percent of the BET specific surface area for these two materials is attributable to pores having diameters less than 6 nanometers.

Ammonia Capacity Test of Example 1

A simple flow-through custom built delivery system was used to deliver known concentrations of ammonia to the sample for measurement. Stainless steel tubing was used throughout the delivery system Ammonia (dry and 10,000 ppm certified ammonia in nitrogen) was delivered to the system from a pressurized gas cylinder (Oxygen Service Company, St. Paul, Minn.). The ammonia/nitrogen stream was further diluted with additional nitrogen by use of a series of digital mass flow controllers (available under the designation DFC26 from Aalborg, Orangeburg, N.Y.) to deliver a 1000 ppm stream of ammonia at a flow of 50 mL/minute to the testing tube. The digital mass flow controllers were calibrated by placing a Gilibrator-2 Primary Airflow Calibrator (Sensidyne, St. Petersburg, Fla.) at the output of each controller. The Gilibrator flow meter was used to measure a range of flows from each flow controller which was used to generate calibration curves. Using these calibrations curves, the mass flow controllers were set to deliver the desired ammonia concentration at the desired gas flow rate.

The ammonia removal capacity for Example 1 was determined by adding material of Example 1 to a tared test tube until the bed depth in the tube was 0.5 cm after being tamped. The mass of the sample was then determined by weighing the sample in the test tube and was determined to be 38.3 mg. The test tube was then connected in line with the system, allowing the 1000 ppm ammonia gas stream to flow through the sample. To the downstream side of the test tube, tubing was connected that led to a gas chromatograph instrument (SRI 8610C, SRI Instruments, Torrance, Calif.). At the time the ammonia gas stream began to pass though the test sample, the test was considered started, and a timer was started. The SRI gas chromatograph then periodically sampled the gas stream and passed the sample through a 6'×⅛" AT steel Alltech Chromosorb 103 80/100 column (Alltech Associates, Grace Davidson Discovery Sciences, Bannockburn, Ill.). The gas chromatograph instrument was equipped with a 10.6 eV lamp photoionization detector to detect ammonia in the effluent. It was observed that good detection of ammonia vapor was found when the gas chromatograph sampled the gas stream for 20 seconds, allowed the sample to pass through the column for 280 seconds and then allowed 60 seconds to flush out the sample before it drew in the next sample to be analyzed.

Prior to testing, a pressurized gas cylinder (Oxygen Services Company, St. Paul, Minn.) of certified 57 ppm ammonia in nitrogen was used to calibrate the gas chromatograph software. The signal generated by this effluent was used to set the software to 50 ppm ammonia. The end point of the ammonia vapor test was defined as the time point at which the ammonia effluent passing through the material of Example 1 produced a signal on the PID detector which exceeded that of the signal calibrated as 50 ppm. By these criteria, the ammonia vapor test of the material of Example 1 took 26 minutes to reach the end point. Based on the mass of material of Example 1 used and the amount of ammonia delivered to the material over the 26 minutes required to produce the desired signal signifying the end of the test, this material showed a 1.36 mmoles/gram capacity for ammonia.

Example 2

The polymeric material of Preparatory Example 4 was treated with a hydrolyzing agent (NaOH). More specifically, 3.5 grams (87.5 mmoles) of NaOH was dissolved in 60 mL of MeOH within a 4 ounce jar. To this solution was added 0.50 grams of the precursor polymer of Preparatory Example 4, which was prepared from a monomer mixture containing 51.0 wt. % DVB, 36.2 wt. % MA, and 12.8 wt. % styrene-type monomers. The jar was then capped and placed in a sand bath at 80° C. This suspension was heated at this elevated temperature for 18 hours. The solid was isolated by vacuum filtration and washed with deionized water. The solid was placed in a 20 mL vial, and the vial was half filled with 0.1 M aqueous HCl. The solid was allowed to stand in the aqueous HCl for 30 minutes. The solid was again isolated by vacuum filtration and washed with deionized water. The solid was then dried under high vacuum at 80° C. overnight. This material had a $SA_{BET}$ of 216.7 m$^2$/gram and a total pore volume of 0.239 cm$^3$/gram (p/p° equal to 0.977) as determined by argon adsorption.

Example 3

The polymeric material of Preparatory Example 5 was treated with a hydrolyzing agent (NaOH). More specifically, 3.5 grams (87.5 mmoles) of NaOH was dissolved in 60 mL of MeOH. To this solution was added 0.50 grams of the precursor polymeric material of Preparatory Example 5, which was prepared from a monomer mixture containing 58.1 wt. % DVB, 27.4 wt. % MA, and 14.5 wt. % styrene-type monomers. The jar was then capped and placed in a sand bath at 80° C. This suspension was heated at this elevated temperature for 18 hours. The solid was isolated by vacuum filtration and washed with deionized water. The solid was placed in a 20 mL vial, and the vial was half filled with 0.1 M aqueous HCl. The solid was allowed to stand in the aqueous HCl for 30 minutes. The solid was again isolated by vacuum filtration and washed with deionized water. The solid was then dried under high vacuum at 80° C. overnight. This material had a $SA_{BET}$ of 476.1 m$^2$/g and a total pore volume of 0.437 cm$^3$/gram (p/p° equal to 0.976) as determined by argon adsorption.

Example 4

The polymeric material of Preparatory Example 6 was treated with a hydrolyzing agent (NaOH). More specifically, 2.1 grams (52.5 mmoles) of NaOH was dissolved in 36 mL of MeOH. To this solution was added 0.30 grams of the precursor polymer of Preparatory Example 6, which was prepared from a monomer mixture of 51.2 wt. % DVB, 36.0 wt. % MA, and 12.8 wt. %, styrene-type monomers. The jar was then capped and placed in a sand bath at 80° C. This suspension was heated at this elevated temperature for 18 hours. The solid was isolated by vacuum filtration and washed with MeOH. The solid was placed in a 40 mL vial, and the vial was half filled with 1 M aqueous HCl. The solid was allowed to stand in the aqueous HCl overnight. The solid was again isolated by vacuum filtration and washed with deionized water. The solid was then dried under high vacuum at 80° C. overnight. This material had a $SA_{BET}$ of 117.1 m$^2$/g and a total pore volume of 0.096 cm$^3$/gram (p/p° equal to 0.976) as determined by argon adsorption.

Example 5

The polymeric material of Preparatory Example 7 was treated with a hydrolyzing agent (NaOH). In a 40 mL vial, 2.1 grams (52.5 mmoles) of NaOH was dissolved in 36 mL of MeOH. To this solution was added 0.30 grams of the precursor polymer of Preparatory Example 7, which was prepared from a monomer mixture containing 58.1 wt. % DVB, 27.4 wt. % MA, and 14.5 wt. % styrene-type monomer. The jar was then capped and placed in a sand bath at 80° C. This suspension was heated at this elevated temperature for 18 hours. The solid was isolated by vacuum filtration and washed with deionized water. The solid was placed in a 20 mL vial, and the vial was half filled with 0.1 M aqueous HCl. The solid was allowed to stand in the aqueous HCl for 30 minutes. The solid was again isolated by vacuum filtration and washed with deionized water. The solid was then dried under high vacuum at 80° C. overnight. This material had a $SA_{BET}$ of 346.1 m$^2$/gram and a total pore volume of 0.348 cm$^3$/gram (p/p° equal to 0.975) as determined by argon adsorption.

Comparative Preparatory Example 1

In a 4 ounce jar, 2.14 grams (13.1 mmoles) DVB (80 wt. %, tech grade), 1.61 grams (16.4 mmoles) of MA, and 75.3 milligrams (311 micromoles) of BPO were dissolved in 71.25 grams of EtOAc. The polymerizable composition had 5.0 wt. % solids in EtOAc and contained a monomer mixture (45.7 wt. % DVB, 42.9 wt. % MA, and 11.4 wt. % styrene-type monomers) and 2 wt. % BPO (based on total weight of monomers). The polymerizable composition was bubbled with nitrogen for 10 minutes. The jar was then capped and placed in a sand bath at 95° C. The polymerizable composition was heated at this elevated temperature for 17 hours. A white precipitate that had formed was isolated by vacuum filtration and washed with EtOAc. The solid was placed in a 4 ounce jar and 100 mL of EtOAc was added to the jar. The solid was allowed to stand in EtOAc for one hour at room temperature. The solid was again isolated by vacuum filtration and washed with EtOAc. The solid was placed in a 4 ounce jar and 100 mL of EtOAc was added. The solid was allowed to stand in EtOAc overnight. The solid was again isolated by vacuum filtration and washed with EtOAc. The solid was then dried under high vacuum at 110° C. overnight. This material had a $SA_{BET}$ of 518.6 m$^2$/gram and a total pore volume of 0.495 cm$^3$/gram (p/p° equal to 0.977) as determined by argon adsorption.

Comparative Example 1

In a 4 ounce jar, 3.5 grams (87.5 mmoles) of NaOH was dissolved in 60 mL of MeOH. To this solution was added 0.50 grams of the polymeric material of Comparative Preparatory Example 1. The jar was then capped and placed in a sand bath at 80° C. This suspension was heated at this elevated temperature for 18 hours. The solid was isolated by vacuum filtration and washed with deionized water. The solid was placed in a 20 mL vial, and the vial was half filled with 0.1 M aqueous HCl. The solid was allowed to stand in the aqueous HCl for 30 minutes. The solid was again isolated by vacuum filtration and washed with deionized water. The solid was then dried under high vacuum at 80° C. overnight. This material had no measureable BET specific surface area or porosity as determined by argon adsorption.

Comparative Preparatory Example 2

In a 4 ounce jar, 2.03 grams (15.6 mmoles) DVB (55% wt. %, tech grade), 1.15 grams (11.7 mmoles) of MA and 63.2 milligrams (261 µmol) of BPO was dissolved in 63.7 g of EtOAc. The polymerization composition thus consisted of an EtOAc solution of DVB/MA/styrene-type monomers present at 34.9, 36.0 and 29.1 wt. %, respectively, at 4.8 wt. % solids and 2 wt. % BPO (based on total weight of monomer). The polymerizable composition was bubbled with nitrogen for 10 minutes. The jar was then capped and placed in a sand bath at 95° C. The polymerizable composition was heated at this elevated temperature for 17 hours. A white precipitate had formed and was isolated by vacuum filtration and washed with EtOAc. The solid was placed in a 4 ounce jar and 100 mL of EtOAc was added to the jar. The solid was allowed to stand in EtOAc for one hour at room temperature. The solid was again isolated by vacuum filtration and washed with EtOAc. The solid was placed in a 4 ounce jar and 100 mL of EtOAc was added to the vial. The solid was allowed to stand in EtOAc overnight. The solid was again isolated by vacuum filtration and washed with EtOAc. The solid was then dried under high vacuum at 95° C. for eight hours. This material had a $SA_{BET}$ of 231.2 m$^2$/g and a total pore volume of 0.216 cm$^3$/gram (p/p° equal to 0.978) as determined by argon sorption.

Comparative Example 2

In a 4 ounce jar, 2.09 grams (52.3 mmoles) of NaOH was dissolved in 36 mL of MeOH. To this solution was added 0.30 grams of DVB/MA/styrene-type monomer polymeric material (34.9, 36.0 and 29.1 wt. %, respectively, Comparative Example 2). The jar was then capped and placed in a sand bath at 80° C. This suspension was heated at this elevated temperature for 18 hours. The solid was isolated by vacuum filtration and washed with deionized water. The solid was placed in a 20 mL vial, and the vial was half filled with 0.1 M aqueous HCl. The solid was allowed to stand in the aqueous HCl for 30 minutes. The solid was again isolated by vacuum filtration and washed with deionized water. The solid was then dried under high vacuum at 80° C. overnight. This material had a $SA_{BET}$ of 50.6 m$^2$/g and a total pore volume of 0.054 cm$^3$/gram (p/p° equal to 0.981) as determined by argon sorption.

We claim:

1. A hydrolyzed polymeric material comprising a reaction product of
   a) a non-hydrolyzed precursor polymer comprising a polymerized product of a polymerizable composition comprising
      i) a monomer mixture comprising
         1) 10 to 40 weight percent maleic anhydride based on a total weight of monomers in the monomer mixture; and
         2) 50 to 75 weight percent divinylbenzene based on the total weight of monomers in the monomer mixture; and
         3) 1 to 20 weight percent of a third monomer based on the total weight of monomers in the monomer mixture, wherein the third monomer is styrene, an alkyl substituted styrene, or a combination thereof; and
      ii) an organic solvent comprising a ketone, an ester, acetonitrile, or a mixture thereof, wherein the polymerizable composition is a single phase prior to polymerization; and
   b) a hydrolyzing agent
   wherein the hydrolyzed polymeric material has a plurality of carboxylic acid groups and a BET specific surface area equal to at least 100 m$^2$/gram.

2. The hydrolyzed polymeric material of claim 1, wherein the BET specific surface area is equal to at least 150 m$^2$/gram.

3. The hydrolyzed polymeric material of claim 1, wherein, the monomer mixture comprises 15 to 35 weight percent maleic anhydride, 55 to 75 weight percent divinylbenzene, and 1 to 20 weight percent third monomer.

4. The hydrolyzed polymeric material of claim 1, wherein the monomer mixture comprises 20 to 30 weight percent maleic anhydride, 55 to 75 weight percent divinylbenzene, and 1 to 20 weight percent third monomer.

5. The hydrolyzed polymeric material of claim 1, wherein at least 50 percent of the BET specific surface area is attributable to micropores, mesopores, or a combination thereof.

6. The hydrolyzed polymeric material of claim 1, wherein the organic solvent comprises a ketone comprising methyl ethyl ketone, methyl isobutyl ketone, or a mixture thereof.

7. The hydrolyzed polymeric material of claim 1, wherein the organic solvent comprises an ester comprising an acetate ester comprising ethyl acetate, amyl acetate, tert-butyl acetate, or a combination thereof.

8. The hydrolyzed polymeric material of claim 1, wherein the organic solvent comprises acetonitrile.

9. The hydrolyzed polymeric material of claim 1, wherein the polymerizable composition has percent solids equal to at least 5 weight percent.

10. The hydrolyzed polymeric material of claim 1, wherein the BET specific surface area is in a range of 150 to 600 $m^2$/gram and the concentration of carboxylic acid groups is in a range of 2 to 10 mmoles/gram.

11. The hydrolyzed polymeric material of claim 1, wherein at least 99 weight percent of the monomers in the monomer mixture are divinylbenzene, maleic anhydride, and the third monomer.

12. The hydrolyzed polymeric material of claim 1, wherein the hydrolyzed polymeric material adsorbs at least 0.25 mmoles per gram of a basic nitrogen-containing compound having a molecular weight no greater than 150 grams per mole.

13. A method of making a hydrolyzed polymeric material, the method comprising:
  preparing a polymerizable composition comprising
    i) a monomer mixture comprising
      1) 10 to 40 weight percent maleic anhydride based on a total weight of monomers in the monomer mixture; and
      2) 50 to 75 weight percent divinylbenzene based on the total weight of monomers in the monomer mixture; and
      3) 1 to 20 weight percent of a third monomer based on the total weight of monomers in the monomer mixture, wherein the third monomer is styrene, an alkyl substituted styrene, or a combination thereof; and
    ii) an organic solvent comprising a ketone, an ester, acetonitrile, or a mixture thereof, wherein the polymerizable composition is a single phase prior to polymerization;
  forming a non-hydrolyzed precursor polymer by polymerizing the polymerizable composition; and
  reacting the non-hydrolyzed precursor polymer with a hydrolyzing agent to form the hydrolyzed polymeric material, wherein the hydrolyzed polymeric material has a plurality of carboxylic acid groups and a BET specific surface area equal to at least 100 $m^2$/gram.

* * * * *

UNITED STATES PATENT AND TRADEMARK OFFICE
CERTIFICATE OF CORRECTION

PATENT NO. : 10,000,596 B2
APPLICATION NO. : 15/101201
DATED : June 19, 2018
INVENTOR(S) : Michael Wendland It is certified that error appears in the above-identified patent and that said Letters Patent is hereby corrected as shown below:

In the Specification

Column 6
Line 50, delete "tent-" and insert -- tert- --, therefor.

Column 7
Line 36, delete "-methylproprionate))," and insert -- -methylpropionate)), --, therefor.
Line 41, delete "tent-" and insert -- tert- --, therefor.

Column 10
Line 12, delete "triaalkylamines)," and insert -- trialkylamines), --, therefor.

Column 11
Line 6, delete "tent-" and insert -- tert- --, therefor.

Column 12
Line 12 (approx.), delete "tent-" and insert -- tert- --, therefor.

Column 17
Line 8 (approx.), delete "system" and insert -- system. --, therefor.

Signed and Sealed this
Eighteenth Day of September, 2018

Andrei Iancu
*Director of the United States Patent and Trademark Office*